(12) United States Patent
Moon et al.

(10) Patent No.: US 9,456,080 B2
(45) Date of Patent: Sep. 27, 2016

(54) TELEPHONE SYSTEM BASED ON PRESENCE AND CALL ROUTING METHOD THEREOF

(75) Inventors: Jang Won Moon, Seoul (KR); Jung Hun Moon, Seoul (KR)

(73) Assignee: NHN Corporation, Seongnam-si (KR)

(*) Notice: Subject to any disclaimer, the term of this patent is extended or adjusted under 35 U.S.C. 154(b) by 2492 days.

(21) Appl. No.: 11/495,113

(22) Filed: Jul. 28, 2006

(65) Prior Publication Data

US 2006/0264208 A1   Nov. 23, 2006

Related U.S. Application Data

(63) Continuation of application No. PCT/KR2005/000288, filed on Jan. 31, 2005.

(30) Foreign Application Priority Data

Jan. 30, 2004   (KR) ........................ 10-2004-0006278

(51) Int. Cl.
*H04M 3/42*   (2006.01)
*H04L 29/06*   (2006.01)
(Continued)

(52) U.S. Cl.
CPC .... *H04M 3/42263* (2013.01); *H04L 29/06027* (2013.01); *H04L 65/1026* (2013.01);
(Continued)

(58) Field of Classification Search
CPC .................... H04L 29/06027; H04L 65/1026; H04L 65/1036; H04L 65/1069; H04L 67/24; H04M 3/42263; H04M 7/0006
USPC ............... 370/352, 356, 353, 493, 354, 355; 707/227; 455/426.1, 432.3
See application file for complete search history.

(56) References Cited

U.S. PATENT DOCUMENTS 6,944,150 B1 *   9/2005   McConnell et al. .......... 370/352
7,269,162 B1 *   9/2007   Turner .......................... 370/352
(Continued)

FOREIGN PATENT DOCUMENTS

JP   09-504937   5/1997
JP   10-155168   6/1998
(Continued)

OTHER PUBLICATIONS

PCT International Search Report and Written Opinion of the International Searching Authority mailed Jun. 22, 2005 in PCT/KR2005/000288, filed Jan. 31, 2005.

*Primary Examiner* — Khaled Kassim
(74) *Attorney, Agent, or Firm* — Greer Burns & Crain Ltd.

(57) ABSTRACT

Disclosed are a presence based telephony system and a call routing method thereof. The telephony system includes a presence server for managing presence of telephone service subscribers, and it routes the call dialed to the subscriber to one of the subscriber's wired/wireless telephone terminal or a VoIP terminal accessed through a VoIP gateway according to the subscriber's presence information established in the presence server. According to the present invention, the user uses a VoIP terminal connected to the Internet to receive calls generated to the previously subscribed wired/wireless telephone number without spatial restrictions. Also, the user can use the wired/wireless telephone service without an additional communication device if he has a VoIP terminal connected to the Internet when he buys no expensive telephone at the time of subscribing to a wired telephone service or a mobile telephone service.

26 Claims, 9 Drawing Sheets

(51) Int. Cl.
  *H04L 29/08* (2006.01)
  *H04M 7/00* (2006.01)
  *H04M 7/12* (2006.01)
(52) U.S. Cl.
  CPC ....... *H04L65/1036* (2013.01); *H04L 65/1069* (2013.01); *H04L 67/24* (2013.01); *H04M 7/0033* (2013.01); *H04M 7/0048* (2013.01); *H04M 7/1235* (2013.01); *H04M 7/1255* (2013.01)

(56) References Cited

U.S. PATENT DOCUMENTS

| | | | |
|---|---|---|---|
| 2002/0057668 A1* | 5/2002 | Bos | H04W 8/08 370/349 |
| 2002/0150083 A1 | 10/2002 | Fangman et al. | |
| 2002/0196775 A1* | 12/2002 | Tuohino | H04L 12/66 370/352 |
| 2003/0009530 A1 | 1/2003 | Philonenko et al. | |
| 2003/0022660 A1 | 1/2003 | Payne et al. | |
| 2003/0037113 A1 | 2/2003 | Petrovykh | |
| 2003/0081753 A1* | 5/2003 | Trandal | H04M 3/42195 379/210.01 |
| 2004/0180646 A1* | 9/2004 | Donley et al. | 455/411 |
| 2005/0003830 A1* | 1/2005 | Campbell | H04W 4/16 455/456.1 |
| 2005/0038876 A1* | 2/2005 | Chaudhuri | G06F 17/3087 709/219 |
| 2005/0047389 A1* | 3/2005 | Bond | H04L 29/06027 370/351 |
| 2005/0064894 A1* | 3/2005 | Kusnitz et al. | 455/552.1 |
| 2005/0073574 A1* | 4/2005 | Krisbergh | H04N 7/147 348/14.01 |
| 2005/0164704 A1* | 7/2005 | Winsor | 455/432.3 |
| 2007/0053343 A1* | 3/2007 | Suotula | H04M 7/1285 370/352 |

FOREIGN PATENT DOCUMENTS

| | | |
|---|---|---|
| JP | 10-327249 | 12/1998 |
| JP | 11-046248 | 2/1999 |
| JP | 2002-118575 | 4/2002 |
| JP | 2003-189009 | 7/2003 |
| KR | 2003-0058557 A | 7/2003 |
| KR | 1020030068105 | 8/2003 |
| KR | 1020030090421 | 11/2003 |
| WO | WO 03/025776 A1 | 3/2003 |

\* cited by examiner

TELEPHONE SYSTEM BASED ON PRESENCE AND CALL ROUTING METHOD THEREOF

CROSS-REFERENCE TO RELATED APPLICATIONS

This application is a continuation of International Patent Application No. PCT/KR2005/000288, filed on Jan. 31, 2005, which claims priority to Korean Patent Application No. 10-2004-0006278, filed on Jan. 30, 2004, each of which is incorporated herein by reference.

BACKGROUND

1. Field of the Invention

The present invention relates to a presence-based telephony system. More specifically, the present invention relates to a presence-based telephony system for using a Voice over Internet Protocol (VoIP) terminal to receive a call generated to a wired/wireless telephone number, and a call routing method thereof.

2. Description of the Related Art

As the Internet has been popularized, usage of VoIPs has also increased. The VoIP allows calls to the existing wired or wireless networks through a dedicated program installed in a computer, but the VoIP cannot receive calls because it has no telephone number.

To solve the problem, studies for assigning telephone numbers to the VoIPs according to a VoIP number system have been progressed.

The Internet messenger which is very popular among Internet users represents a system which uses the 3GPP Instant Messaging & Presence protocol (IMPP) to instantly transmit and receive text between computers on the Internet. The system manages presence which indicates a user's current status including the user's online access information, offline information, seat occupation information, and busy information. The above-noted presence is displayed to a buddy list of a person who has registered the user as a buddy to thereby notify the person of a time when to send a message to the user. However, the IMPP of the Internet messenger system only provides the message exchange service between computers and provides no further various services such as a call service to the VoIP or the wired/wireless networks.

As to prior art, Korean published application No. 2003-90421 entitled "Unified presence service system and method" by KT discloses a scheme for managing presence of accesses to various communication service providers by a same subscriber in a unified manner, but it fails to disclose usage of presence for call routing.

As to another prior art, Korean published application No. 2003-58557 entitled "Presence service providing method using SIP in mobile communication packet network" by SKTelecom discloses a method for using a Session Initiation protocol (SIP) to provide a presence service in the mobile communication packet network, but it also fails to disclose usage of presence for call routing.

As to another prior art, Korean published application No. 2003-68105 entitled "Device and method for providing Internet call reception switching service in mobile communication system" by Jae-ryang Ko discloses a system in which a mobile subscriber switches a call generated to the subscriber's phone number not to a mobile device but to a soft phone or an IP phone on the Internet and then answers the call, which however fails to disclose usage of presence for call routing.

As to another prior art, Korean published application No. 2003-58557 entitled "Presence service providing method using SIP in mobile communication packet network" by SKTelecom discloses a method for using a Session Initiation protocol (SIP) to provide a presence service in the mobile communication packet network, but it also fails to disclose usage of presence for call routing.

As to another prior art, Korean published application No. 2003-68105 entitled "Device and method for providing Internet call reception switching service in mobile communication system" by Jae-ryang Ko discloses a system in which a mobile subscriber switches a call generated to the subscriber's phone number not to a mobile device but to a soft phone or an IP phone on the Internet and then answers the call, which however fails to disclose usage of presence for call routing.

SUMMARY

It is an advantage of the present invention to provide a presence-based telephony system for using an IMPP presence concept and an existing wired/wireless communication telephone number to allow the usage of VoIP, and a control method thereof.

In one aspect of the present invention, a telephony system based on presence comprises: a wired/wireless telephone system for providing a call connection service to a wired/wireless telephone terminal; a Voice over Internet protocol (VoIP) gateway coupled between the wired/wireless telephone system and the Internet, and providing a call connection service to a VoIP terminal; and a presence server accessed to the wired/wireless telephone system, the VoIP gateway, and the VoIP terminal, and managing presence of a wired/wireless call service subscriber, wherein the wired/wireless telephone system routes a call dialed to the subscriber to one of the subscriber's wired/wireless telephone terminal and the VoIP terminal accessed through the VoIP gateway according to presence information established in the presence server.

In another aspect of the present invention, a call routing method in a telephony system based on presence comprises (a) receiving a call dialed by a wired/wireless telephone terminal; (b) acquiring presence information of a subscriber who will receive the dialing call; and (c) routing the dialing call to one of the dialed subscriber's wired/wireless telephone terminal and the VoIP terminal according to the acquired presence information.

DETAILED DESCRIPTION

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention.

Accordingly, the drawings and description are to be regarded as illustrative in nature, and not restrictive. To clarify the present invention, parts which are not described in the specification are omitted, and parts for which same descriptions are provided have the same reference numerals.

Figure 1:
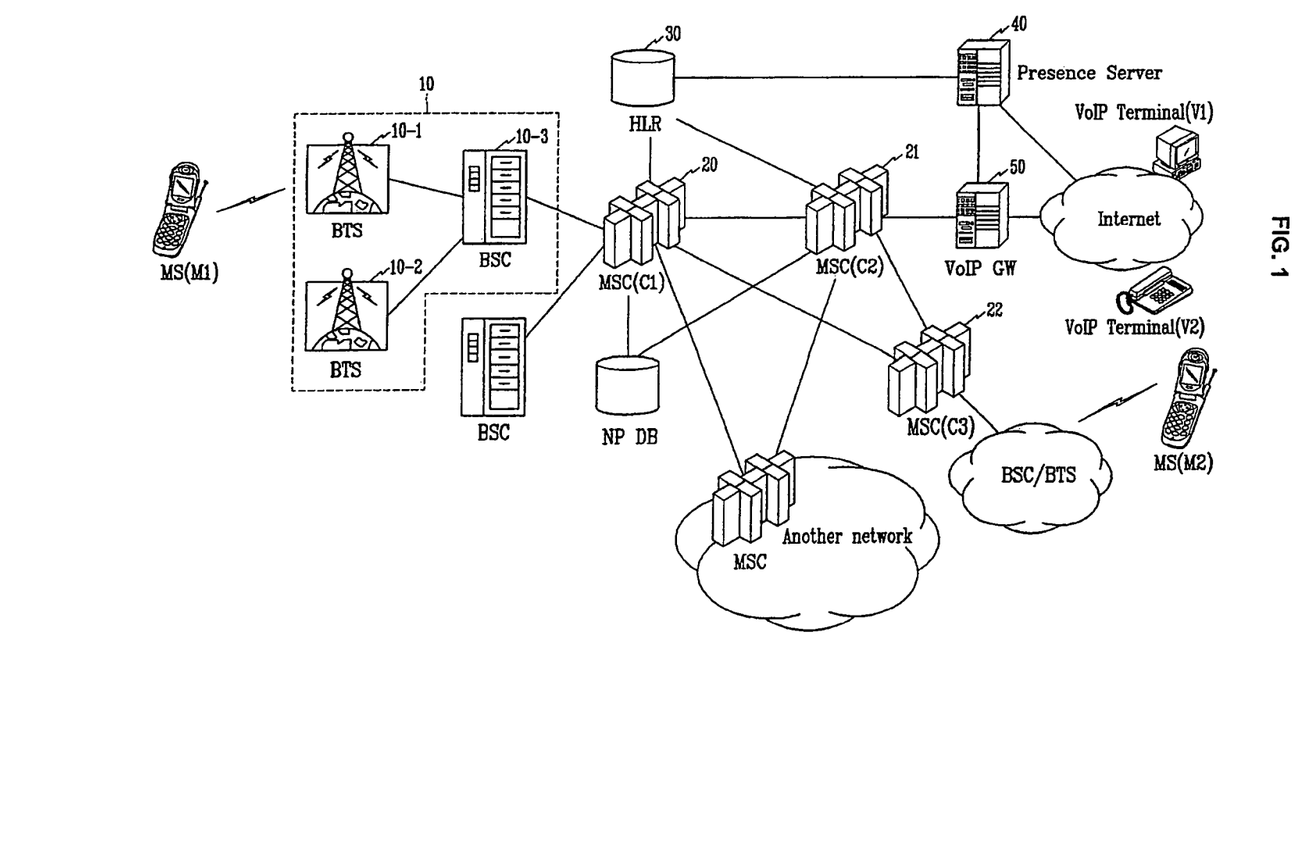
FIG. 1 shows a block diagram of a presence-based telephony system according to an exemplary embodiment of the present invention.

FIG. 1 shows a block diagram of a presence-based telephony system according to an exemplary embodiment of the present invention.

As shown, the presence-based telephony system includes base stations (BSs) 10 and 11, mobile switching centers (MSCs) 20, 21, and 22, a home location register (HLR) 30, a presence server 40, and a VoIP gateway 50.

The base stations 10 and 11 provide a mobile communication service to mobile devices (MSs) M1 and M2, and include base transceiver stations (BTSs) 10-1 and 10-2 for interface between the mobile devices M1 and M2 and a mobile communication network, and a base station controller (BSC) 10-3 for managing the base transceiver stations 10-1 and 10-2 and managing power of signals, frequencies, and handovers.

The mobile switching centers 20, 21, and 22 manage call connections for telephone terminals accessed through the base stations 10 and 11 or VoIP gateway 50, and establish, cancel, and manage connection paths.

The home location register 30 connected to the mobile switching centers 20 and 21 stores and manages dialed subscriber information, per-subscriber additional service information, and location information on a dialed terminal, and is a database for storing categories of services and ID information on a mobile switching center in a home network. Differing from the prior art, the home location register 30 distinguishes a first case of using the VoIP through VoIP terminals V1 and V2 and a second case of using the VoIP without VoIP terminals V1 and V2, and uses presence information of the subscriber to transmit a location of the mobile switching center and subscriber information to the mobile switching centers 20 and 21 so that a dialed call may be provided to the VoIP terminals V1 and V2 when the VoIP is in use. In this instance, the home location register 30 uses per-subscriber presence information stored in the presence server 40 to determine whether to use the VoIP.

The home location register 30 stores an electronic serial number (ESN), a mobile identification number (MIN), a home mobile switching center identification (MSC ID), and other subscriber information. In this instance, the ESN can be an integer type and is used to identify a terminal, the MIN can be an integer type and includes a telephone number, the home MSC ID can be an integer type and is an ID of a mobile switching center nearest a place where the subscriber subscribes to a service, and the other subscriber information can be a composite type and is general information on the HLR including service categories provided to the subscriber.

The presence server 40 manages presence of subscribers including the subscribers' status (offline, online, seat occupation, and dining states), addresses, and preferred device information.

In detail, the presence server 40 stores a user ID, a mobile device number, status information, a contact address, an MSC ID, and preferred device information. In detail, the user ID can be a string type and identifies the user, the mobile device number can be an integer type and is a telephone number of a mobile device to which the call is forwarded, the status information can be an integer type and indicates status of a VoIP terminal such as online, offline, and busy state, the contact address can be an integer type and includes an IP address and a port number for accessing the VoIP terminal, the MSC ID can be an integer type and is an ID of an MSC to which the VoIP terminal is accessed, and the preferred device information can be an integer type and represents a device for receiving a call, including a VoIP terminal and a mobile device. A dialed call or a dialing call is connected to the VoIP terminals V1 and V2 when the VoIP terminals V1 and V2 are registered in preferred device information, and the same is connected to the mobile devices M1 and M2 when the mobile devices M1 and M2 are registered in preferred device information.

When receiving a preferred information inquiry on the mobile devices M1 and M2 from the HLR 30, the presence server 40 transmits preferred device information on the telephone numbers of the mobile devices M1 and M2 to the HLR 30, and concurrently transmits thereto an ID of the MSC to which the corresponding VoIP terminals V1 and V2 are accessed, and IP addresses and port numbers for accessing the VoIP terminals V1 and V2 when the VoIP terminals V1 and V2 are established to be a preferred device.

The VoIP gateway 50 allows the VoIP terminals V1 and V2 having accessed the Internet to transmit or receive a call on the Internet in cooperation with the Public Land Mobile Network/Public Switched Telephone Network (PLMN/PSTN). The VoIP terminals V1 and V2 include a softphone and an IP phone which are realized by a device or a program for transmitting or receiving calls through the VoIP gateway 50 on the Internet. The softphone includes an Internet phone realized as a software program in a PC, a PDA, and a mobile device, and the IP phone represents an Internet phone dedicated device having a program function of the softphone and a hardwired telephone structure. When using the VoIP terminals V1 and V2 to log on, the user can input a telephone number to be mapped and receive a call dialed to the corresponding number through the VoIP terminals V1 and V2. In this instance, the input telephone number is transmitted to the presence server 40 to be stored therein.

A call routing method in a presence based telephony system according to an exemplary embodiment of the present invention will now be described with reference to drawings.

Figure 2:
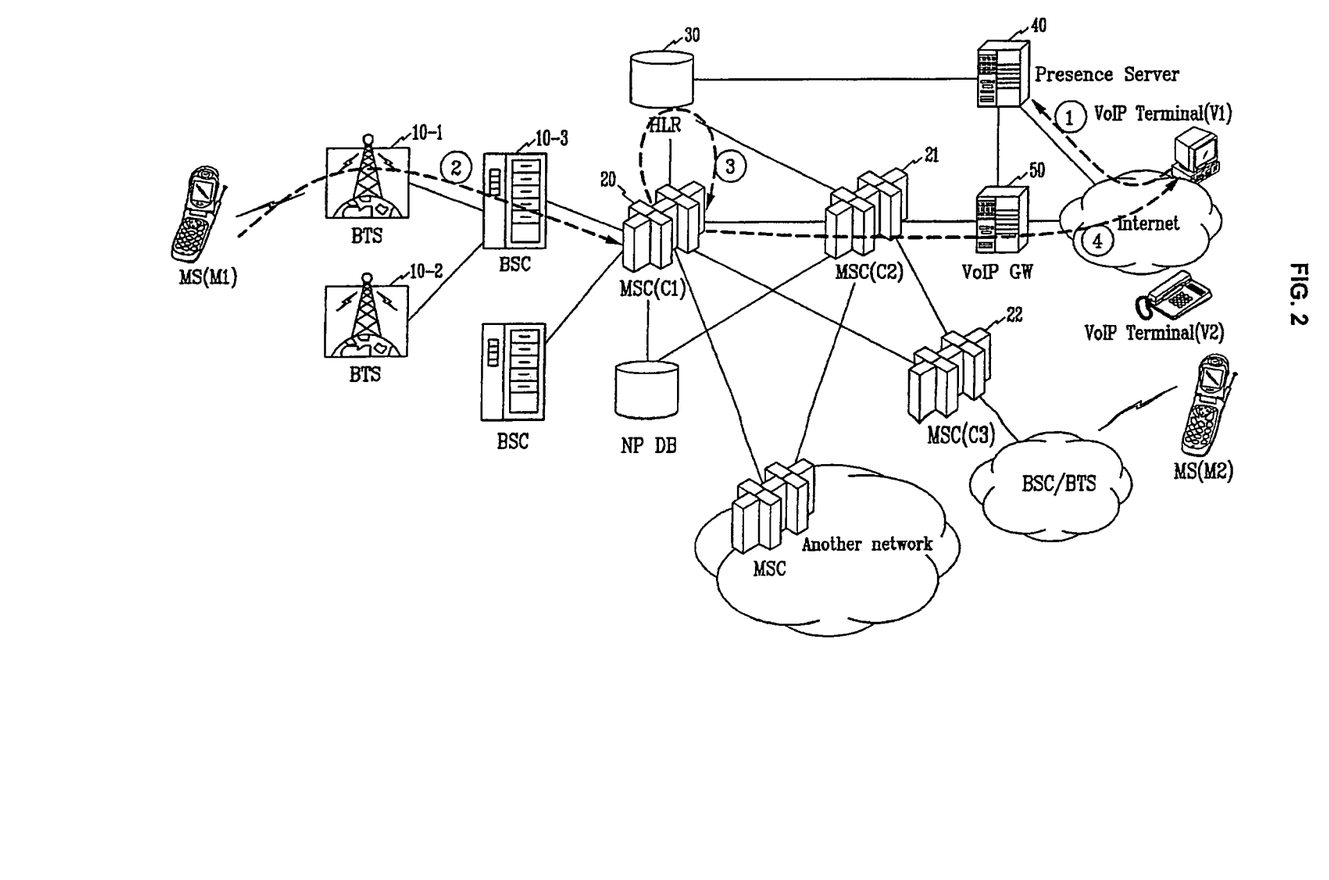
FIG. 2 shows a process for connecting a dialing call generated by a mobile device M1 to a VoIP terminal V1 in a presence-based telephony system according to an exemplary embodiment of the present invention.

FIG. 2 shows a process for connecting a dialing call generated by a mobile device M1 to a VoIP terminal V1 in a presence-based telephony system according to an exemplary embodiment of the present invention.

Referring to FIG. 2, when a subscriber of a mobile device M2 uses a VoIP terminal V1, the VoIP terminal V1 is automatically or manually established as a preferred device for the telephone number of the mobile device M2 to the presence server 40, shown by ①. The method for establishing the preferred device will be described later.

When a mobile device M1 telephones the mobile device M2, a call is established between an MSC 20 to which the mobile device M1 currently belongs and the mobile device M1 through the base transceiver station 10-1 and the BSC 10-3, shown by ②.

When the MSC 20 requests a location of an MSC to which the mobile device M2 currently belongs from the HLR 30 so as to know the location of the mobile device M2, the HLR 30 receives preferred device information on the dialed telephone number of the mobile device M2, information on the MSC 21 to which the VoIP terminal V1 is accessed, and an IP address and a port number for accessing the VoIP terminal V1 from the presence server 40, and transmits the same to the MSC 20, shown by ③.

The MSC 20 uses information on the MSC 21 and the VoIP terminal V1 provided by the HLR 30, and connects a dialed call to the VoIP terminal V1 through the MSC 21 and the VoIP gateway 50 to thereby connect the dialed call provided by the mobile device M1 to the VoIP terminal V1 currently used by the subscriber and allow a telephonic communication between the mobile device M1 and the VoIP terminal V1, shown by ④. Therefore, the subscriber can receive the call generated to the subscriber's wired/wireless telephone number by using the VoIP terminal V1.

Figure 3:
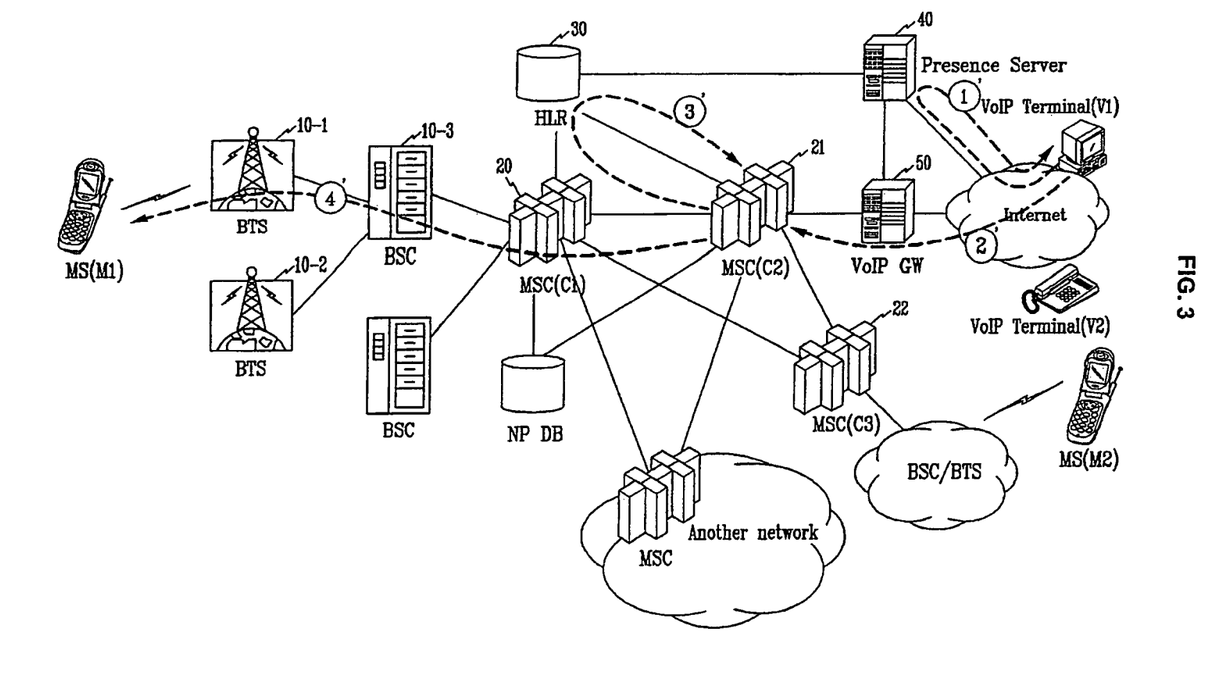
FIG. 3 shows a process for connecting a dialing call generated by a VoIP terminal V1 to a mobile device M1 in a presence-based telephony system according to an exemplary embodiment of the present invention.

FIG. 3 shows a process for connecting a dialing call generated by a VoIP terminal V1 to a mobile device M1 in a presence-based telephony system according to an exemplary embodiment of the present invention.

It is assumed before describing the exemplary embodiment with reference to FIG. 3 that the mobile device M1 is established as preferred device information for the telephone number of the mobile device M1 in the presence server 40, and it is also desirable in this case to establish a preferred device of the telephone number of a mobile device to be the corresponding mobile device.

When a user of the VoIP terminal V1 telephones the mobile device M1 under the above-described assumption, the VoIP terminal V1 receives preferred device information on the telephone number of the dialed mobile device M1 from the presence server 40, and checks whether the preferred device for the telephone number of the dialed mobile device M1 corresponds to the mobile device M1, shown by ①'.

The VoIP terminal V1 establishes a call to the MSC 21 to which the VoIP terminal V1 currently belongs through the VoIP gateway 50 so as to be connected to the mobile device M1, shown by ②'.

When the MSC 21 requests a location of an MSC to which the mobile device M1 currently belongs from the HLR 30 so as to know the location of the mobile device M1, the HLR 30 provides information on the MSC 20 to which the mobile device M1 belongs to the MSC 21, shown by ③'. In this instance, the HLR 30 does not refer to preferred device information through the presence server 40 since the VoIP terminal has already referred to the preferred device information through the presence server 40 when the VoIP terminal generates a dialing call for requesting location information of the MSC, and it is also possible for the purpose of easy design of the HLR 30 that the HLR 30 receives preferred device information corresponding to a telephone number through the presence server 40 in all cases and uses the same when location information of the MSC is requested.

The MSC 21 uses information on the MSC 20 provided by the HLR 30 to connect a dialed call to the mobile device M1 through the MSC 20, the BSC 10-3, and the base transceiver station 10-1, and thereby connect the dialed call provided by the VoIP terminal V1 to the mobile device M1 used by the subscriber and allow a telephonic communication between the VoIP terminal V1 and the mobile device M1, shown by ④'. Therefore, the subscriber can telephone the mobile device M1 by using the VoIP terminal V1 based on the presence.

Figure 4:
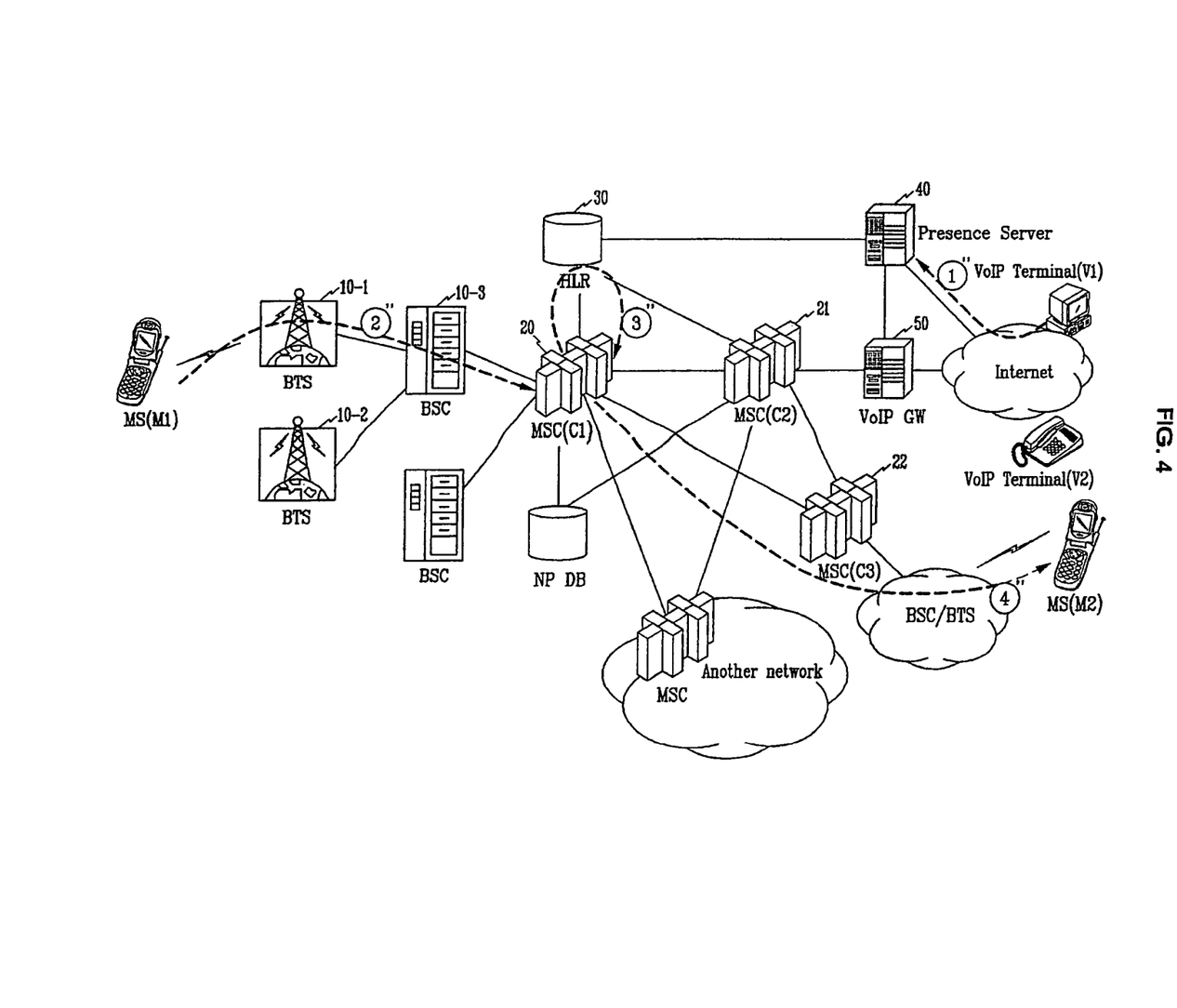
FIG. 4 shows a process for connecting a dialing call generated by a mobile device M1 to another mobile device M2 in a presence-based telephony system according to an exemplary embodiment of the present invention.

FIG. 4 shows a process for connecting a dialing call generated by a mobile device M1 to another mobile device M2 in a presence-based telephony system according to an exemplary embodiment of the present invention.

Referring to FIG. 4, when a subscriber of the mobile device M2 uses a VoIP terminal V1 to establish the VoIP terminal V1 as a preferred device to the presence server 40 and the subscriber then stops usage of the VoIP terminal V1 and attempts to use the mobile device M2 again, the user automatically or manually establishes the mobile device M2 as a preferred device for the telephone number of the mobile device M2 to the presence server 40, shown by ①".

When the mobile device M1 telephones the mobile device M2, a call is established between the mobile device M1 and the MSC 20 to which the mobile device M1 belongs through the base transceiver station 10-1 and the BSC 10-3, shown by ②".

When the MSC 20 requests a location of an MSC to which the mobile device M2 currently belongs from the HLR 30 so as to know the location of the mobile device M2, the HLR 30 receives preferred device information for the telephone number of the dialing mobile device M2 through the presence server 40, and provides information on the MSC 22 to which the mobile device M2 belongs to the MSC 20 since the mobile device M2 is established as a preferred device, shown by ③".

The MSC 20 uses information on the MSC 22 provided by the HLR 30 to connect a dialed call to the mobile device M2 through the MSC 22 and the BS 11 and thereby connect the dialed call provided by the mobile device M1 to the mobile device M2 in use and allow a telephonic communication between the mobile device M1 and the mobile device M2, shown by ④". Therefore, the subscriber receives the presence-based call by using the mobile device M2.

Figure 5:
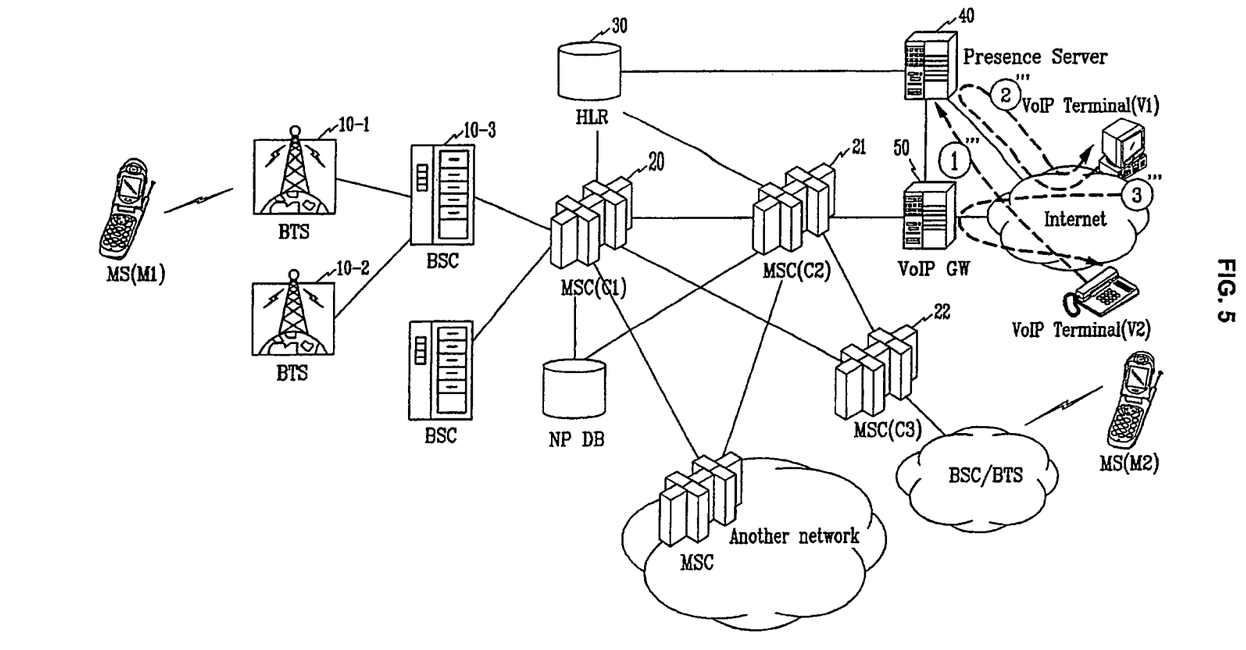
FIG. 5 shows a process for connecting a dialing call generated by a VoIP terminal V1 to another VoIP terminal V2 in a presence-based telephony system according to an exemplary embodiment of the present invention.

FIG. 5 shows a process for connecting a dialing call generated by a VoIP terminal V1 to another VoIP terminal V2 in a presence-based telephony system according to an exemplary embodiment of the present invention.

Referring to FIG. 5, when the subscriber of the mobile device M1 uses a VoIP terminal V2, the subscriber automatically or manually establishes the VoIP terminal V2 as a preferred device for the telephone number of the mobile device M1 to the presence server 40, shown by ①'''.

When the user of the VoIP terminal V1 telephones the mobile device M1, the VoIP terminal V1 receives preferred device information on the telephone number of the dialed mobile device M1 through the presence server 40, and checks whether the preferred device for the telephone number of the dialed mobile device M1 corresponds to the VoIP terminal V2, shown by ②'''.

The VoIP terminal V1 is connected to the VoIP terminal V2 through the VoIP gateway 50 in the VoIP system to perform a telephonic communication, shown by ③'''. In this instance, the dialing or dialed process is performed through the wired/wireless telephone number based on the presence in the VoIP system without connection to the PLMN/PSTN since users of the mobile devices M1 and M2 use the VoIP terminals V1 and V2.

The process for transmitting or receiving a call by using the mobile devices M1 and M2 or the VoIP terminals V1 and V2 in the presence-based telephony system according to the exemplary embodiment of the present invention has been described with reference to FIGS. 2 to 5. Call routing is performed when the HLR 30 provides subscriber information, and the routing is exceptionally performed in the VoIP system without the HLR 30 when a dialing call provided by the VoIP terminals V1 and V2 is routed to the VoIP terminals V1 and V2. The HLR 30 determines whether to request relevant information, that is, preferred device information from the presence server 40, and route a call to the subscriber's mobile devices M1 and M2 or to route the call to the VoIP terminals V1 and V2, when providing subscriber information in the above-noted routing process.

Realization of the routing process requires the following four processes.

The first process is for a subscriber of mobile devices M1 and M2 to register VoIP terminals V1 and V2 to the presence server 40 when the subscriber logs in to the presence server 40 from the VoIP terminals V1 and V2 so as to use the VoIP terminals V1 and V2. The mobile devices M1 and M2 and the VoIP terminals V1 and V2 were in use since the mobile devices M1 and M2 were established as the preferred device corresponding to the telephone number of the mobile devices M1 and M2, but the call routing is now performed on the mobile devices M1 and M2 because of establishment of the preferred device.

The second process is to establish the VoIP terminals V1 and V2 as a preferred device, that is, to determine to which device the subscriber of mobile devices M1 and M2 routes the call. In this instance, the call provided to the telephone number of the mobile devices M1 and M2 is forwarded to the corresponding VoIP terminals V1 and V2 when the VoIP terminals V1 and V2 are established as a preferred device.

The third process is to forward the call. In detail, The MSC on the side of a dialing person receives a call request from the dialing person, and requests information for detecting a dialed person's location from the HLR 30, and the HLR 30 provides information according to the preferred device established to the presence server 40 so that the call may be forwarded to the terminal established to be a preferred device.

The last process is to perform unregistration to route the call to the mobile devices M1 and M2 when the usage of VoIP terminals V1 and V2 is terminated.

The above-described four processes will now be described with reference to drawings.

Figure 6:
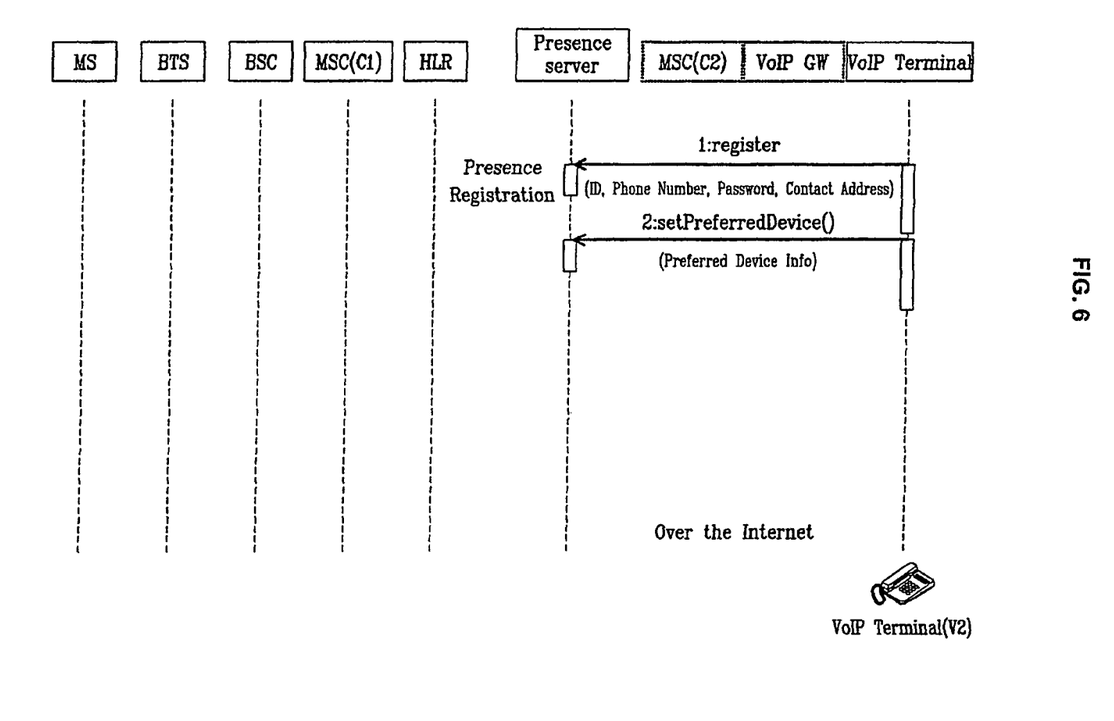
FIG. 6 shows a process for registering and updating presence in a presence-based telephony system according to an exemplary embodiment of the present invention.

FIG. 6 shows a process for registering and updating presence in a presence-based telephony system according to an exemplary embodiment of the present invention. In detail, FIG. 6 shows that a user logs in to the presence server 40 through the VoIP terminals V1 and V2 to register the user's status and establish a preferred device.

The process of register( ) is to transmit information on the VoIP terminals V1 and V2 such as an ID, a telephone number, a password, and a contact address to the presence server 40 to register presence information, and thereby the VoIP terminals V1 and V2 becomes online. In this instance, the online state represents a state in which the VoIP terminals V1 and V2 can receive a call, but the call is actually transmitted to the mobile devices M1 and M2 since the VoIP terminals V1 and V2 have a low preference when the mobile devices M1 and M2 are online.

The process of setPreferredDevice( ) for establishing a preferred device is to transmit a signal for indicating that the most preferred device through which the subscriber desires to receive a call is the VoIP terminals V1 and V2 to the presence server 40 to thus update preferred device information. When this process is finished, the VoIP terminals V1 and V2 have the highest preference, and the call is transmitted not to the mobile devices M1 and M2 of the dialed person but to the VoIP terminals V1 and V2.

Figure 7:
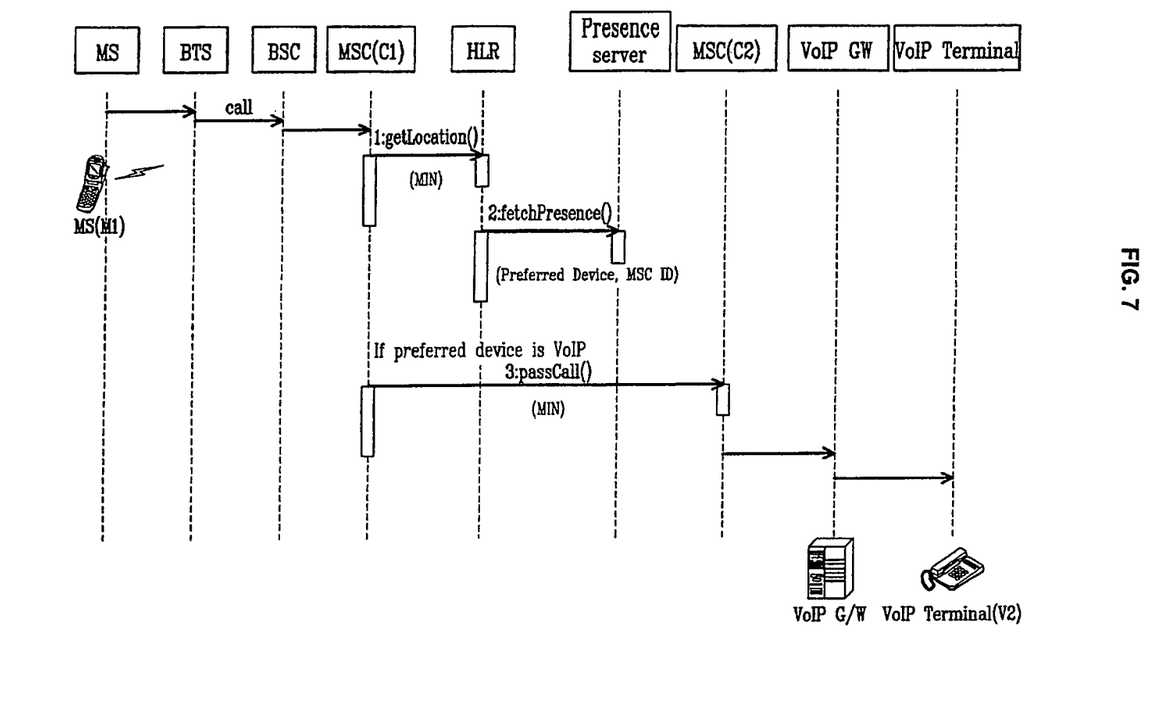
FIG. 7 shows a process for forwarding a call according to presence in a presence-based telephony system according to an exemplary embodiment of the present invention.

FIG. 7 shows a process for forwarding a call according to presence in a presence-based telephony system according to an exemplary embodiment of the present invention. In detail, FIG. 7 shows a process for forwarding a call based on the presence among the HLR 30, the presence server 40, and the MSCs 20, 21, and 22.

The process of getLocation( ) for requesting a location of a dialed person is for the MSCs 20, 21, and 22 of a dialing person to request the location of the dialed person from the HLR 30.

The process of fetchPresence( ) for receiving device information to which the call will be forwarded is for the HLR 30 to request preferred device information and other information relevant to the preferred device information (e.g., information on the MSC to which corresponding VoIP terminals V1 and V2 are connected, and an IP address and a port number for accessing the VoIP terminals V1 and V2 when the VoIP terminals V1 and V2 are established as a preferred device) from the presence server 40 and receive the same therefrom.

The process of passCall( ) for forwarding the call is for the MSC having received location information on the dialed person from the HLR 30 to forward the call to the preferred device of the dialed person.

Figure 8:
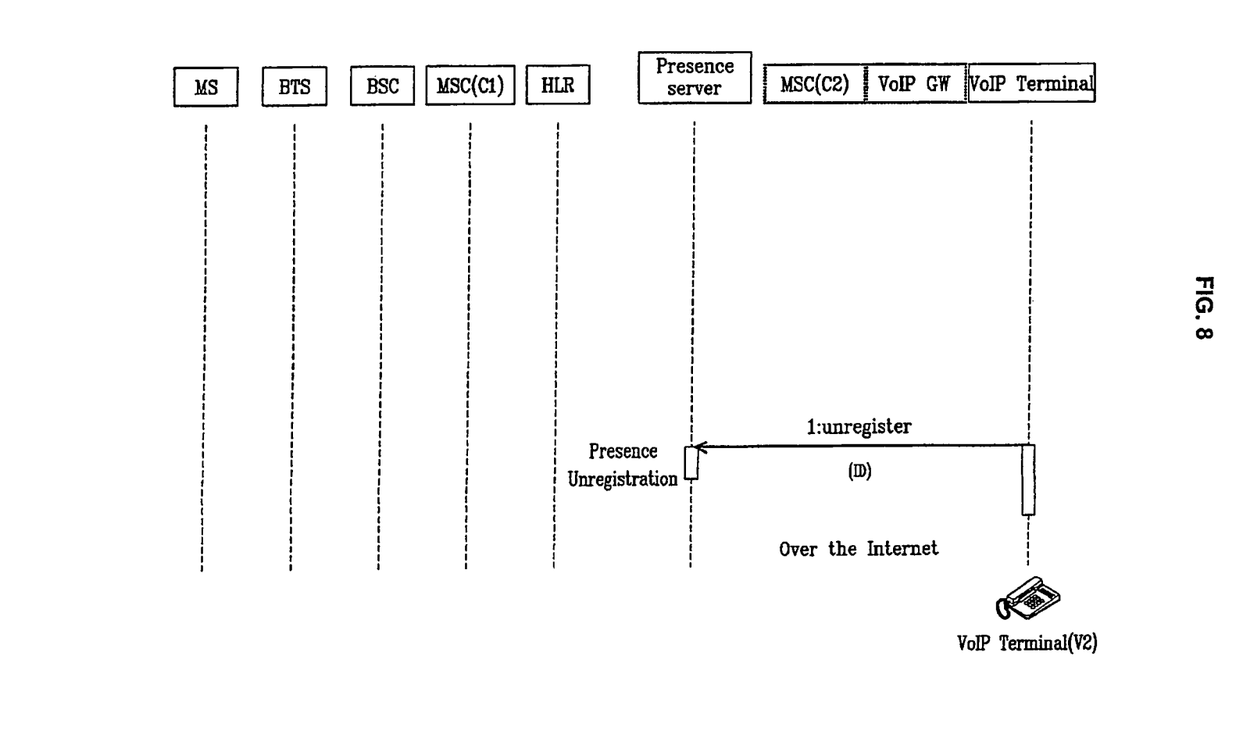
FIG. 8 shows a process for unregistering presence in a presence-based telephony system according to an exemplary embodiment of the present invention.

FIG. 8 shows a process for unregistering presence in a presence-based telephony system according to an exemplary embodiment of the present invention.

Referring to FIG. 8, when the user transmits an unregister( ) request indicating unregistration to the presence server 40 from the VoIP terminals V1 and V2 so as to terminate the usage of VoIP terminals V1 and V2, the call is forwarded to the mobile devices M1 and M2 in a like manner described with reference to FIG. 7 since the mobile devices M1 and M2 become the preferred device when the HLR 30 requests a fetchPresence( ) from the presence server 40.

Various methods for modifying the subscriber's presence will be described which include a method for automatically modifying the presence based on the establishment and other factors of a method for manually modifying the same through the subscriber's manipulation.

The method for automatically modifying the presence will now be described.

The first method is to automatically change the presence when a VoIP terminal is logged on. The presence is automatically changed so that the user may use the VoIP terminal when the user using the mobile devices M1 and M2 or a cable telephone logs in to the VoIP terminal.

In detail, when the user using the existing wired/wireless telephone drives a VoIP terminal, the user receives a right to use a VoIP terminal through a certification process. When the certification is successful, the presence server 40 automatically modifies the presence so that call routing may be available to the VoIP terminal, and the user can then receive/transmit a call by using the corresponding VoIP terminal.

The second method is to automatically change the presence when the user generates no reaction for a predetermined time, established by the user. The presence is automatically switched to a wired/wireless telephone to which the corresponding VoIP terminal is subscribed when the user generates no reaction caused by manipulation of the VoIP terminal for a specific initial time or a predetermined time (e.g., reaction caused through a mouse and a keyboard of a computer, and peripherals).

In detail, when the user activates establishment of the automatic presence switching function of the VoIP terminal and inputs an automatic switching time, the VoIP terminal requests a change of presence from the presence server 40 when no reaction caused by manipulation of the VoIP terminal is provided for a specific initial time or an automatic switching time input by the user. Therefore, the presence server 40 checks that the VoIP terminal having requested the change of presence is certified, and automatically switches the presence of the corresponding user to the wired/wireless telephone so that the user may receive the call through the corresponding wired/wireless telephone.

The third method is to automatically switch the presence by using a position tracking system for tracking the position of a mobile device through a base station. The presence is automatically changed by utilizing the position tracking system so that the mobile device may be dialed when the mobile device leaves an area where the VoIP terminal is available.

In detail, when the user who was using a VoIP terminal carries a mobile device with him and moves to another region from the VoIP terminal available area without additional establishment, the base station senses the movement of the mobile device by the user, the MSC requests a change of presence of the corresponding user upon registering location information of the corresponding mobile device to the HLR 30, and the HLR 30 communicates with the presence server 40 to modify the corresponding user's presence and thereby allow the user to receive a call through a corresponding subscribed wired/wireless telephone.

The methods for manually modifying the presence will now be described.

The first method is for the user to manually switch the presence while using a VoIP terminal. That is, the user can modify the user's presence information in the VoIP terminal status, and thereby the user manually switches the presence.

In detail, when the user activates the function of receiving a call through a wired/wireless telephone while using a VoIP terminal, the VoIP terminal requests a change of presence from the presence server 40 so that the call routing may be available through the wired/wireless telephone, and hence, the user can receive a call by using the subscribed wired/wireless telephone.

The second method is to manually switch the presence by utilizing the automatic response system (ARS). An ARS for establishing the user's presence is provided to the user, and the user accesses the ARS through a wired/wireless telephone to select a menu number, thereby switching the presence.

In detail, the user desiring to modify the presence uses a wired/wireless telephone to access an allocated ARS number, and selects a menu for modifying the presence according to the ARS guide. When the user finishes the desired selection, the MSC requests a change of presence from the HLR 30 according to the corresponding establishment, and the HLR 30 checks the presence through a communication with the presence server 40, and modifies the presence when a condition is satisfied, so that the call routing may be available with the subscribed wired/wireless telephone. Hence, the user can receive a call with the corresponding subscribed wired/wireless telephone.

The third method is to manually switch the presence by utilizing a virtual machine (VM) application of a mobile device. The presence is modified by driving the VM application downloaded into the mobile device.

In detail, the mobile device user downloads a VM application for presence modification to the mobile device according to a predetermined receiving method, and drives the VM application. When the user performs a desired establishment, the presence server 40 checks the established presence, and modifies the presence when the established presence satisfies a condition so that the call routing may be available with the subscribed wired/wireless telephone. Hence, the user can receive a call with the corresponding subscribed wired/wireless telephone.

The fourth method is to manually switch the presence by utilizing the wireless Internet. The user accesses the wireless Internet for establishing the presence of the user, and modifies the presence.

In detail, the user accesses the wireless Internet through a mobile device, and selects a menu for modifying the presence. When the user performs a desired establishment, the presence server 40 checks the established presence, and modifies the presence when the established presence satisfies a condition so that the call routing may be available with the subscribed wired/wireless telephone. Hence, the user can receive a call with the corresponding subscribed wired/wireless telephone.

The fifth method is to manually switch the presence by short message service (SMS) transmission. The presence is modified by transmitting an SMS message to a specific service telephone number through the mobile device. In this instance, it is desirable to modify the presence irrespective of message contents.

In detail, the user uses a mobile device to transmit an SMS message to which the user's current state is written to an allocated number to the system, the system receives the SMS message, requests a change of presence from the MSC, the MSC requests a change of presence according to a corresponding establishment from the HLR 30, and the HLR 30 checks the presence through a communication with the presence server 40 and modifies the presence when the established presence satisfies a condition so that the call routing may be available with the subscribed wired/wireless telephone. Hence, the user can receive a call with the corresponding subscribed wired/wireless telephone.

The sixth method is to manually switch the presence through a dedicated IP phone. The presence is modified when the user selects a drive of a 'call routing' function of the IP phone for establishing the presence.

In detail, when the user establishes a 'call routing' function on the dedicated IP phone, the IP phone requests a change of presence from the presence server 40 so that the call routing may be available with the subscribed wired/wireless telephone. Hence, the user can receive a call with the subscribed wired/wireless telephone.

The seventh method is to manually switch the presence by utilizing a dedicated mobile device having a call routing function therein.

In detail, when the user uses a mobile device with a built-in call routing function to establish presence, the MSC requests a change of presence according to the corresponding establishment from the HLR 30, and the HLR 30 checks the presence through a communication with the presence server 40 and modifies the presence when the established presence satisfies a condition so that the call routing may be available with the subscribed wired/wireless telephone. Hence, the user can receive a call with the desired device.

The eighth method is to manually switch the presence through the web.

In detail, when the user accesses a website which provides a presence modification function to finish a certification process and determines a receiving method through the presence modification, the web system requests corresponding establishment from the MSC, the MSC requests a change of presence according to the corresponding establishment from the HLR 30, and the HLR 30 checks the presence through a communication with the presence server 40 and modifies the presence when the established presence satisfies a condition so that the call routing may be available with the subscribed wired/wireless telephone.

Hence, the user can receive a call with the subscribed wired/wireless telephone.

The above-noted methods are described on the wireless network basis, and are also applicable to cable networks, cable intelligent networks, and next generation networks (NGNs).

Figure 9:
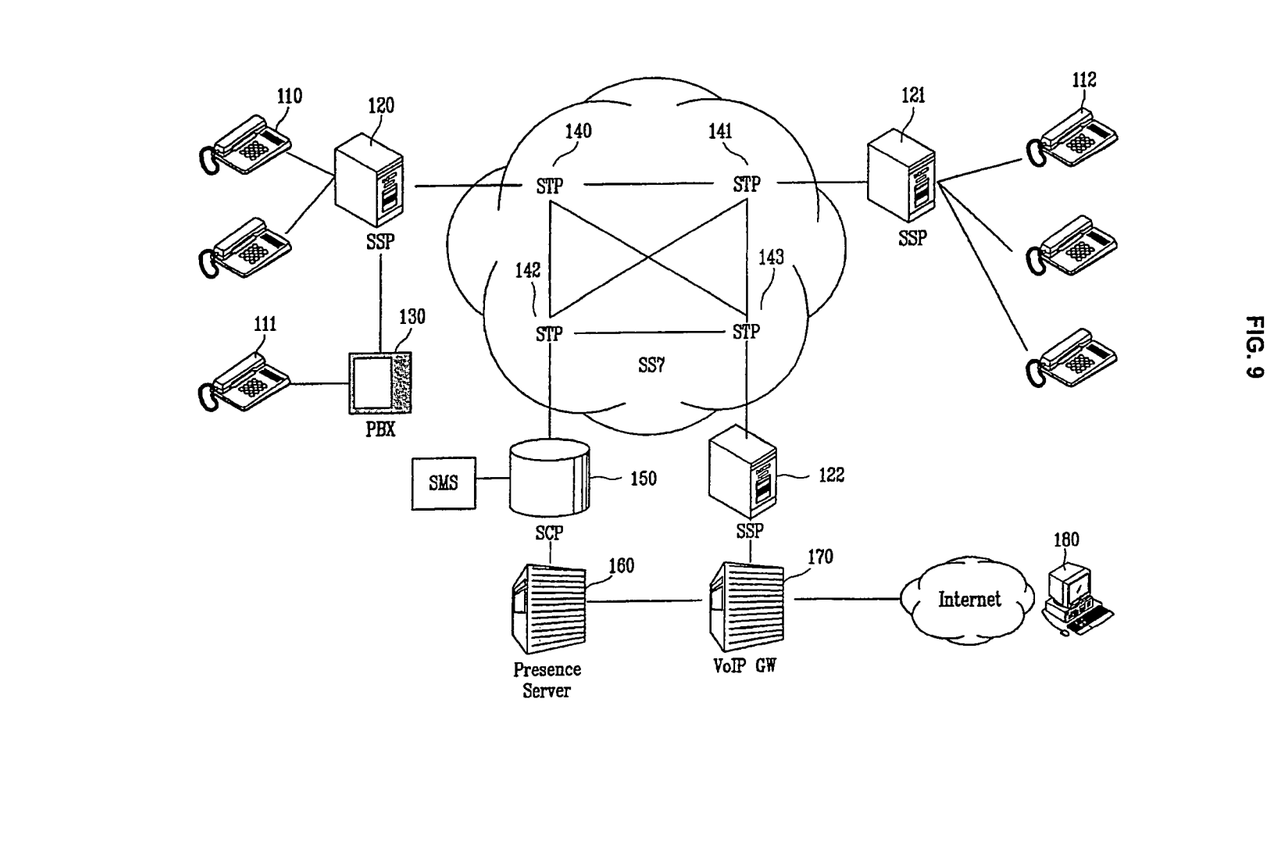
FIG. 9 shows a block diagram of a presence-based cable intelligent network system according to an exemplary embodiment of the present invention.

FIG. 9 shows a block diagram of a presence-based cable intelligent network system according to an exemplary embodiment of the present invention.

As shown, the presence-based cable intelligent network system based on the standard communication rule of Common Channel Signaling System No. 7 (SS7 protocol) defined by ITU-T includes service switching points (SSPs) 120, 121, and 122, signal transfer points (STPs) 140, 141, 142, and 143, a service control point (SCP) 150, a presence server 160, and a VoIP gateway 170.

The SSPs 120 and 121 provide an intelligent network service to wired terminals 110 and 112 accessed through transmission of signal messages with each other. In this instance, the SSP 120 can be accessed to a wired terminal 111 through a private branch exchange (PBX) 130.

The STPs 140, 141, 142, and 143 transmit signals of the SS7 protocol to the wired terminals accessed through the SSPs 120 and 121 or the VoIP gateway 170 accessed to the SSP 122.

The SCP 150 accessed to the STP 142 stores and manages information on dialed subscribers, per-subscriber additional services, and locations of dialed terminals. The SCP 150 has the same function as that of the HLR 30 for a presence-based call connection described with reference to FIGS. 1 to 8. That is, information for identifying a case of using the VoIP through a VoIP terminal and a case of not using the VoIP based on the subscriber's presence information including the location of the SSP managing the subscriber and subscriber information is transmitted to the SSP 120 and 121 so that a dialed signal may be connected to the VoIP terminal 180 when the VoIP is in use. In this instance, the SCP 150 uses the per-subscriber presence information stored in the presence server 160 to determine whether to use the VoIP.

The presence server 160 and the VoIP gateway 170 will not be described since they almost correspond to those of FIGS. 1 to 8 described on the wireless network basis.

No call routing method in the above-structured and functioned presence-based cable intelligent network system will be described since the configuration and operation of the SSPs 120, 121, and 122, the SCP 150, the presence server 160, and the VoIP gateway 170 are similar to those of the HLR 30, the MSC 20, 21, and 22, the presence server 40, and the VoIP gateway 50 shown in FIGS. 1 to 8, and they will be easily understood by a person skilled in the art.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

For example, it has been described in the above that the user can use a VoIP terminal to receive a call provided to a telephone number of the user's mobile device by modifying the presence between the mobile device and the VoIP terminal, that is, by modifying the preferred device information, and without being restricted to this, it will also be easily understood by a person skilled in the art by referring to the above descriptions that a user of a wired telephone can use the VoIP terminal to receive a call provided to the user's wired telephone number by modifying the presence between the wired telephone and the VoIP terminal, that is, by modifying the preferred device information.

Therefore, the user can receive calls generated to the user's existing wired/wireless telephone number by using a VoIP terminal connected to the Internet without spatial restrictions.

Also, the user can use wired/wireless telephone services without an additional communication device if the user has a VoIP terminal connected to the Internet when subscribing to a wired telephone service or a mobile telephone service.

Further, the user can pay a lesser network access fee to communication service providers compared to the case of transmitting a call through the existing cable network or mobile communication network since the call received by the user is transmitted through the Internet, and hence, the user's calling fee is reduced.

What is claimed is:

1. A communications system based on presence, comprising:

a base station configured to receive an outgoing call signal from a first communications device and transmit an incoming call signal to the first communications device;

a telephone network in communication with the base station and including a plurality of switching centers for routing the outgoing and incoming call signals through the telephone network;

a VoIP gateway coupled between the telephone network and a computer network and configured to connect to a VoIP communications device through the computer network;

a presence server in communication with the telephone network, the VoIP gateway, and the VoIP communications device, the presence server configured to store presence information of a subscriber associated with a second communications device and the VoIP communications device under a telephone number, the presence information comprising preferred device information indicative of which of the second communications device and the VoIP communications device has a higher preference by the subscriber for communicating under the telephone number; and a call signal routing controller configured to communicate with the presence server and the plurality of switching centers in the telephone network, and enable the outgoing call signal from the first communications device to be routed through at least one select switching center to one of the second communications device and the VoIP communications device according to the preferred device information retrieved from the presence server, so that the subscriber receives the outgoing call signal on one of the second communications device and the VoIP communications device, wherein when the VoIP communications device has a higher preference by the subscriber, an IP address and at least one port number for accessing the VoIP communications device and an ID of the at least one select switching center are transmitted to a home location register (HLR), wherein when the second communications device is a wireless telephone device, at least one select switching center call-connected to the first communications device requests information on the subscriber from the HLR, and the HLR receives corresponding status information from the presence server storing the presence information on the subscriber, and transmits the preferred device information to the at least one select switching center call-connected to the first communications device according to the subscriber's presence information, and wherein if the wireless telephone terminal has a higher preference by the subscriber for receiving the dialed call according to the preferred device information of the subscriber, the dialed call is routed to the wireless telephone device of the subscriber through the select switching center of the wireless telephone device, without going through the VoIP gateway.

2. The system of claim 1, wherein the call signal routing controller is configured to store and manage subscriber information, per-subscriber additional service information, and location information of the second communications device, and configured to provide a location of the at least one select switching center and subscriber information to the at least one select switching center based on the subscriber's location information provided by the presence server.

3. The system of claim 1, wherein if a call request is originated from the VoIP communications device, a target communications device for the call request is determined according to the presence information.

4. The system of claim 1, wherein the presence information is automatically or manually modified by the presence server through the VoIP communications device.

5. The system of claim 1, wherein the presence information is automatically or manually modified by the presence server through a wired/wireless telephone terminal.

6. The system of claim 1, wherein the presence server is accessed through the VoIP communications device by instant messaging and presence protocol, and wherein the presence server is further configured to store the presence information of the subscriber associated with the second communications device and the VoIP communications device under the same telephone number.

7. A call routing method in a telephony system, comprising:

receiving a call dialed for a telephone number from a telephone device in a telephone network;

acquiring from a presence server presence information of a subscriber, associated with a communications device and a VoIP communications device under the telephone number, to receive the dialed call on either the communications device or the VoIP communications device, the presence information comprising preferred device information indicative of which of the communications device and the VoIP communications device has a higher preference by the subscriber for communicating under the telephone number, the presence server being connected to the telephone network; and routing, based upon the preferred device information and through at least one select switching center, in the telephone network, for routing telephone calls, the dialed call to one of the communications device and the VoIP communications device for the subscriber to receive the dialed call, wherein when the VoIP communications device has a higher preference by the subscriber, an IP address and at least one port number for accessing the VoIP communications device and an ID of the at least one select switching center are transmitted to a home location register (HLR), wherein when the communications device is a wireless telephone device, said acquiring comprises:
  requesting, by at least one select switching center call-connected to the telephone device, information on the subscriber from the HLR;
  receiving, by the HLR, corresponding status information from the presence server storing the presence information on the subscriber; and
  transmitting, by the HLR, the preferred device information to the at least one select switching center call-connected to the telephone device according to the subscriber's presence information, and wherein if the wireless telephone terminal has a higher preference by the subscriber for receiving the dialed call according to the preferred device information of the subscriber, the dialed call is routed to the wireless telephone device of the subscriber through the select switching center of the wireless telephone device, without going through the VoIP gateway.

8. The call routing method of claim 7, wherein, if the VoIP device has a higher preference by the subscriber for receiving the dialed call according to the preferred device information of the subscriber, the dialed call to the VoIP device of the subscriber is routed through a VoIP gateway configured to access the VoIP device.

9. A call routing method in a telephony system based on presence, comprising:

receiving a request for presence information on a dialed subscriber from a first VoIP communications device in a VoIP system, the presence information indicating which of a telephone terminal and a second VoIP communications device has a higher preference by the dialed subscriber for communicating under a telephone number, and the dialed subscriber associated with the telephone terminal and the second VoIP communications device under the telephone number;

providing from a presence server the presence information on the dialed subscriber to the first VoIP communications device, the presence server being connected to the VoIP system;

receiving a dialing call for the telephone number from the first VoIP communications device; and routing, according to the presence information, the dialing call to the telephone terminal through at least one select switching center, in the telephone network, for routing telephone calls, when the telephone terminal has the higher preference, and to the second VoIP communications device when the second VoIP communications device has the higher preference, for the dialed subscriber to receive the dialing call, wherein when the second VoIP communications device has a higher preference by the dialed subscriber, an IP address and at least one port number for accessing the second VoIP communications device and an ID of the at least one select switching center are transmitted to a home location register (HLR), wherein when the telephone terminal is a wireless telephone terminal, the routing comprises:

requesting, by at least one select switching center call-connected to the first VoIP communications device, dialed subscriber information from the HLR;

transmitting, by the HLR, information on the dialed subscriber to the at least one select switching center call-connected to the first VoIP communications device; and routing, by the at least one select switching center call-connected to the first VoIP device, the dialing call to the dialed subscriber's wireless telephone terminal through the at least one select switching center according to the dialed subscriber information, and wherein if the wireless telephone terminal has a higher preference by the subscriber for receiving the dialed call according to the preferred device information of the subscriber, the dialed call is routed to the wireless telephone device of the subscriber through the select switching center of the wireless telephone device, without going through the VoIP gateway.

10. The call routing method of claim 9, wherein said routing comprises:

routing the dialing call to the second VoIP communications device through a VoIP gateway if the second VoIP device has the higher preference by the dialed subscriber for communicating.

11. The call routing method of claim 9, wherein the presence information is registered with the presence server in response to the dialed subscriber using the second VoIP device to log on to the presence server storing dialed subscriber's presence information.

12. The call routing method of claim 11, wherein the presence information comprises preferred device information indicating which of the telephone terminal and the second VoIP device calls to the subscriber are to be routed to.

13. The call routing method of claim 11, wherein the presence information is automatically modified in response to the wireless telephone terminal being used.

14. The call routing method of claim 11, wherein the presence information is automatically modified if no reaction is provided by the second VoIP communications device during an initial time value established by the second VoIP communcations device or an automatic switching time established by the user.

15. The call routing method of claim 11, wherein the telephone terminal is the wireless telephone terminal, and the presence information is automatically modified by the HLR of the wireless telephone terminal in response to a determination that a location of the wireless telephone terminal sensed through a base transceiver station of the wireless telephone terminal is out of a VoIP device usage area.

16. The call routing method of claim 11, wherein presence information is manually modifiable through the dialed subscriber's second VoIP communications device.

17. The call routing method of claim 11, wherein the presence information is modified by the HLR in response to a request for change to the presence information through an automatic response system (ARS) accessible by a wired/wireless telephone device.

18. The call routing method of claim 11, wherein the presence information is modifiable through a virtual machine (VM) application for modifying the presence information to be downloaded and driven on a wireless telephone device.

19. The call routing method of claim 11, wherein the presence information is modifiable through the wireless Internet using a wireless telephone device.

20. The call routing method of claim 11, wherein the presence information is modifiable through short message service (SMS) transmission using a wireless telephone device.

21. The call routing method of claim 11, wherein the presence information is modifiable by using a dedicated IP phone for setting the presence information.

22. The call routing method of claim 11, wherein the presence information is modifiable by using the wireless telephone terminal with a built-in call routing function.

23. A method of routing calls, the method comprising:

storing on a presence server preferred device information of a user indicating which of a telephone and a VoIP communications device has a higher preference by the user for communicating under a telephone number, the user being associated with the telephone and the VoIP communications device under the telephone number; and connecting a call for the telephone number received by a telephone network to one of the telephone and the VoIP communications device of the user using the preferred device information, the call being routed through at least one select switching center, in the telephone network, for routing telephone calls and a VoIP gateway, wherein the presence server is connected to and in communication with the telephone network, wherein when the VoIP communications device has a higher preference by the user, an IP address and at least one port number for accessing the VoIP communications device and an ID of the at least one select switching center are transmitted to a home location register (HLR), wherein when the telephone is a wireless telephone device, at least one select switching center connecting the call requests information on the user from the HLR, and the HLR receives corresponding status information from the presence server storing the presence information on the user and transmits the preferred device information to the at least one select switching center connecting the call according to the user's presence information, and wherein if the wireless telephone terminal has a higher preference by the user for receiving the dialed call according to the preferred device information of the user, the dialed call is routed to the wireless telephone device of the user through the select switching center of the wireless telephone device, without going through the VoIP gateway.

24. A communications system comprising:

a telephone network configured to connect a call request between a plurality of communications devices, and further configured to engage a VoIP gateway for connecting to a VoIP-enabled communications device;

a presence server configured to store preferred device information of a user associated with a telephone and the VoIP-enabled communications device under a telephone number, the preferred device information indicating which of the telephone and the VoIP-enabled communications device has a higher preference by the user for communicating under the telephone number, the presence server being connected to and in communication with the telephone network; and a connection module configured to connect a call for the telephone number received by the telephone network to one of the telephone and the VoIP-enabled communications device according to the preferred device information stored on the presence server, wherein the call to the VoIP-enabled communications device is routed through at least one select switching center, in the telephone network, for routing telephone calls and a VoIP gateway, wherein when the VoIP-enabled communications device has a higher preference by the user, an IP address and at least one port number for accessing the VoIP-enabled communications device and an ID of the at least one select switching center are transmitted to a home location register (HLR), wherein when the telephone is a wireless telephone device, at least one select switching center connecting the call requests information on the user from the HLR, and the HLR receives corresponding status information from the presence server storing the presence information on the user and transmits the preferred device information to the at least one select switching center connecting the call according to the user's presence information, and wherein if the wireless telephone terminal has a higher preference by the user for receiving the dialed call according to the preferred device information of the user, the dialed call is routed to the wireless telephone device of the user through the select switching center of the wireless telephone device, without going through the VoIP gateway.

25. A communications system comprising:

a server system configured to store preferred device information of a user associated with a communications terminal and a VoIP communications device under a telephone number, the preferred device information indicating which of the communications terminal and the VoIP communications device has a higher preference by the user for communicating under the telephone number; and a network system configured to connect a call for the telephone number received from a telephone in a telephone network to one of the communications terminal and the VoIP communications device of the user using the preferred device information, the call being routed through at least one select switching center, in the telephone network, for routing telephone calls and a VoIP gateway, wherein the server system is connected to the telephone network, wherein when the VoIP communications device has a higher preference by the user, an IP address and at least one port number for accessing the VoIP communications device and an ID of the at least one select switching center are transmitted to a home location register (HLR), wherein when the communications terminal is a wireless telephone device, at least one select switching center connecting the call requests information on the user from the HLR, and the HLR receives corresponding status information from the presence server storing the presence information on the user and transmits the preferred device information to the at least one select switching center connecting the call according to the user's presence information, and wherein if the wireless telephone terminal has a higher preference by the user for receiving the dialed call according to the preferred device information of the user, the dialed call is routed to the wireless telephone device of the user through the select switching center of the wireless telephone device, without going through the VoIP gateway.

26. A presence server in communication with a telephone system, a VoIP gateway, and a VoIP communications device, the telephone system being configured to connect a call to a communications device, and the VoIP gateway being coupled between the telephone system and a network and configured to connect to the VoIP communications device, the presence server comprising:

presence information of a subscriber associated with the communications device and the VoIP communications device under a telephone number, the presence information comprising preferred device information indicative of which of the communications device and the VoIP communications device has a higher preference by the subscriber for communicating under the telephone number, such that the telephone system routes a call dialed to the subscriber's telephone number through at least one select switching center, in the telephone network, for routing telephone calls, to one of the communications device and the VoIP communications device according to the preferred device information, and the subscriber receives the call on one of the communications device and the VoIP communications device, wherein the presence server is connected to the telephone system, wherein when the VoIP communications device has a higher preference by the subscriber, an IP address and at least one port number for accessing the VoIP communications device and an ID of the at least one select switching center are transmitted to a home location register (HLR), wherein when the communications device is a wireless telephone device, at least one select switching center routing the call requests information on the subscriber from the HLR, and the HLR receives corresponding status information from the presence server storing the presence information on the subscriber and transmits the preferred device information to the at least one select switching center routing the call according to the subscriber's presence information, and wherein if the wireless telephone terminal has a higher preference by the subscriber for receiving the dialed call according to the preferred device information of the subscriber, the dialed call is routed to the wireless telephone device of the subscriber through the select switching center of the wireless telephone device, without going through the VoIP gateway.

* * * * *